(12) United States Patent     (10) Patent No.:   US 12,642,247 B2

Zagaeski et al.             (45) Date of Patent:     Jun. 2, 2026

---

(54) MIXER KNIFE AND APPARATUS WITH MIXER KNIFE

(71) Applicants: Peter Zagaeski, Rock Valley, IA (US); Zachary Pramann, Beresford, SD (US)

(72) Inventors: Peter Zagaeski, Rock Valley, IA (US); Zachary Pramann, Beresford, SD (US)

(73) Assignee: Kooima Ag, Inc., Rock Valley, IA (US)

( * ) Notice: Subject to any disclaimer, the term of this patent is extended or adjusted under 35 U.S.C. 154(b) by 339 days.

(21) Appl. No.: 18/385,142

(22) Filed: Oct. 30, 2023

(65) Prior Publication Data

US 2025/0134061 A1     May 1, 2025

(51) Int. Cl.
| | |
|---|---|
| *A01K 5/00* | (2006.01) |
| *A01F 29/00* | (2006.01) |
| *A01F 29/02* | (2006.01) |
| *A01F 29/06* | (2006.01) |
| *A01F 29/10* | (2006.01) |

(Continued)

(52) U.S. Cl.
CPC ............ *A01K 5/004* (2013.01); *A01F 29/005* (2013.01); *A01F 29/025* (2013.01); *A01F 29/06* (2013.01); *A01F 29/10* (2013.01); *B01F 27/171* (2022.01); *B01F 27/172* (2022.01)

(58) Field of Classification Search
CPC ......... A01K 5/00; A01K 5/004; A01F 29/005; A01F 29/025; A01F 29/06; A01F 29/10; B02C 18/00; B02C 18/06; B02C 18/16; B02C 18/18; B01F 27/171; B01F 27/172
See application file for complete search history.

(56) References Cited

U.S. PATENT DOCUMENTS

| | | | | | |
|---|---|---|---|---|---|
| 5,823,449 | A | * | 10/1998 | Kooima | ................. A01K 5/004 |
| | | | | | 241/300 |
| 2012/0018560 | A1 | * | 1/2012 | Denis | ...................... B02C 18/18 |
| | | | | | 241/294 |

(Continued)

OTHER PUBLICATIONS

"Knife grinds: flat grinds, hollow grinds, convex grinds and scandi's", 7 pages, website www.knivesandtools.com/en/ct/knife-grinds.htm, download date Sep. 11, 2023.

(Continued)

*Primary Examiner* — Christopher L Templeton
*Assistant Examiner* — Matthew Stephens
(74) *Attorney, Agent, or Firm* — Jeffrey A. Proehl; Woods Fuller Shultz & Smith P.C.

(57) ABSTRACT

An agricultural mixer knife for use with an agricultural mixer apparatus may include a plate with opposite sides and opposite faces and a perimeter between the sides. The plate has a cutting edge which is serrated with primary and secondary edge sections. The primary edge sections may have a sharp tip formed by a first converging surface and a second converging surface. The second converging surface may have a first region and a second region, with the first region being concave and depressed into the plate with respect to the second region. In some embodiments, the first region may be elongated along a first axis extending substantially parallel to the sharp tip of the primary edge section. In some embodiments, the first converging surface may be substantially planar, and may have a cladding material applied thereto.

20 Claims, 9 Drawing Sheets

(51) Int. Cl.
    *B01F 27/171*          (2022.01)
    *B01F 27/172*          (2022.01)

(56)                  References Cited

U.S. PATENT DOCUMENTS

| | | | |
|---|---|---|---|
| 2019/0255717 A1* | 8/2019 | Pustilnik | B26B 9/02 |
| 2020/0009517 A1* | 1/2020 | Repka | A01K 5/004 |
| 2020/0107503 A1* | 4/2020 | Bernard | A01K 5/001 |
| 2020/0368752 A1* | 11/2020 | Kooima | B02C 18/18 |

OTHER PUBLICATIONS

"FAQ: What are the advantages and disadvantages of a hollow grind?", Jul. 14, 2015, 2 pages, website, www.knivesshipfree.com/knife-knowledge/.

\* cited by examiner

MIXER KNIFE AND APPARATUS WITH MIXER KNIFE

BACKGROUND

Field

The present disclosure relates to livestock feed mixer apparatus and more particularly pertains to a new mixer knife and apparatus with mixer knife with features for prolonging the effective cutting life of the mixer knife.

SUMMARY

In some aspects, the present disclosure relates to an agricultural mixer knife for mounting on an auger of an agricultural mixer apparatus. The knife may comprise a plate having a first side and a second side, with a portion of the first side forming a first face and a portion of the second side forming a second face. The plate has a perimeter positioned between the first and second sides, and may have a leading extent for being moved by the auger toward the material to be cut and a trailing extent opposite of the leading extent. The plate has a cutting edge located on the leading extent of the perimeter, and the cutting edge may be serrated with a plurality of edge sections arranged in a stepped contiguous relationship along the cutting edge. The plurality of edge sections may include primary edge sections and secondary edge sections. The primary edge section may have a sharp tip formed by a pair of converging surfaces which may include a first converging surface and a second converging surface. The first converging surface may be adjacent to the first face of the plate and the second converging surface may be adjacent to the second face. The second converging surface may have a first region and a second region, with the first region being concave and depressed into the plate with respect to the second region. The first region may be elongated along a first axis extending substantially parallel to the sharp tip of the primary edge section.

In other aspects, the present disclosure relates to a system comprising an agricultural mixer apparatus which may include a frame, a tub mounted on the frame and defining an interior for receiving ingredients of animal feed, and an auger positioned in the interior of the tub and being rotatable with respect to the frame. The auger may include a central mast rotatably mounted on the frame, and flighting mounted on the central mast to rotate with the mast and having an outer edge. The system may also include a mixer knife mounted on the auger and positioned to extend from the auger to engage ingredients of animal feed in the interior of the tub. The knife may comprise a plate having a first side and a second side, with a portion of the first side forming a first face and a portion of the second side forming a second face. The plate has a perimeter positioned between the first and second sides, and may have a leading extent for being moved by the auger toward the material to be cut and a trailing extent opposite of the leading extent. The plate has a cutting edge located on the leading extent of the perimeter, and the cutting edge may be serrated with a plurality of edge sections arranged in a stepped contiguous relationship along the cutting edge. The plurality of edge sections may include primary edge sections and secondary edge sections. The primary edge section may have a sharp tip formed by a pair of converging surfaces which may include a first converging surface and a second converging surface. The first converging surface may be adjacent to the first face of the plate and the second converging surface may be adjacent to the second face. The second converging surface may have a first region and a second region, with the first region being concave and depressed into the plate with respect to the second region.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
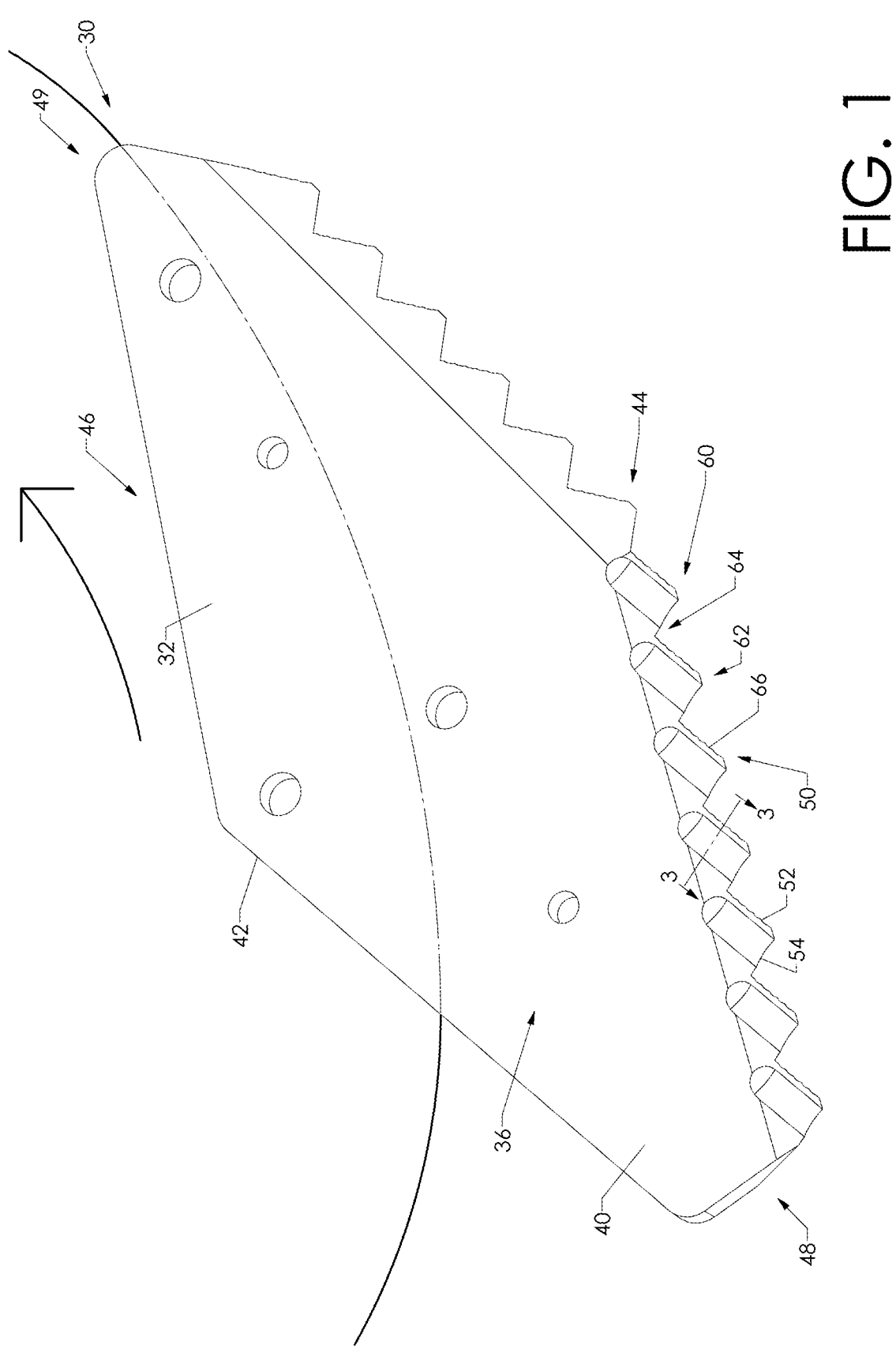
FIG. 1 is a schematic upper perspective view of a first side of a new mixer knife of the system according to the present disclosure.
Figure 2:
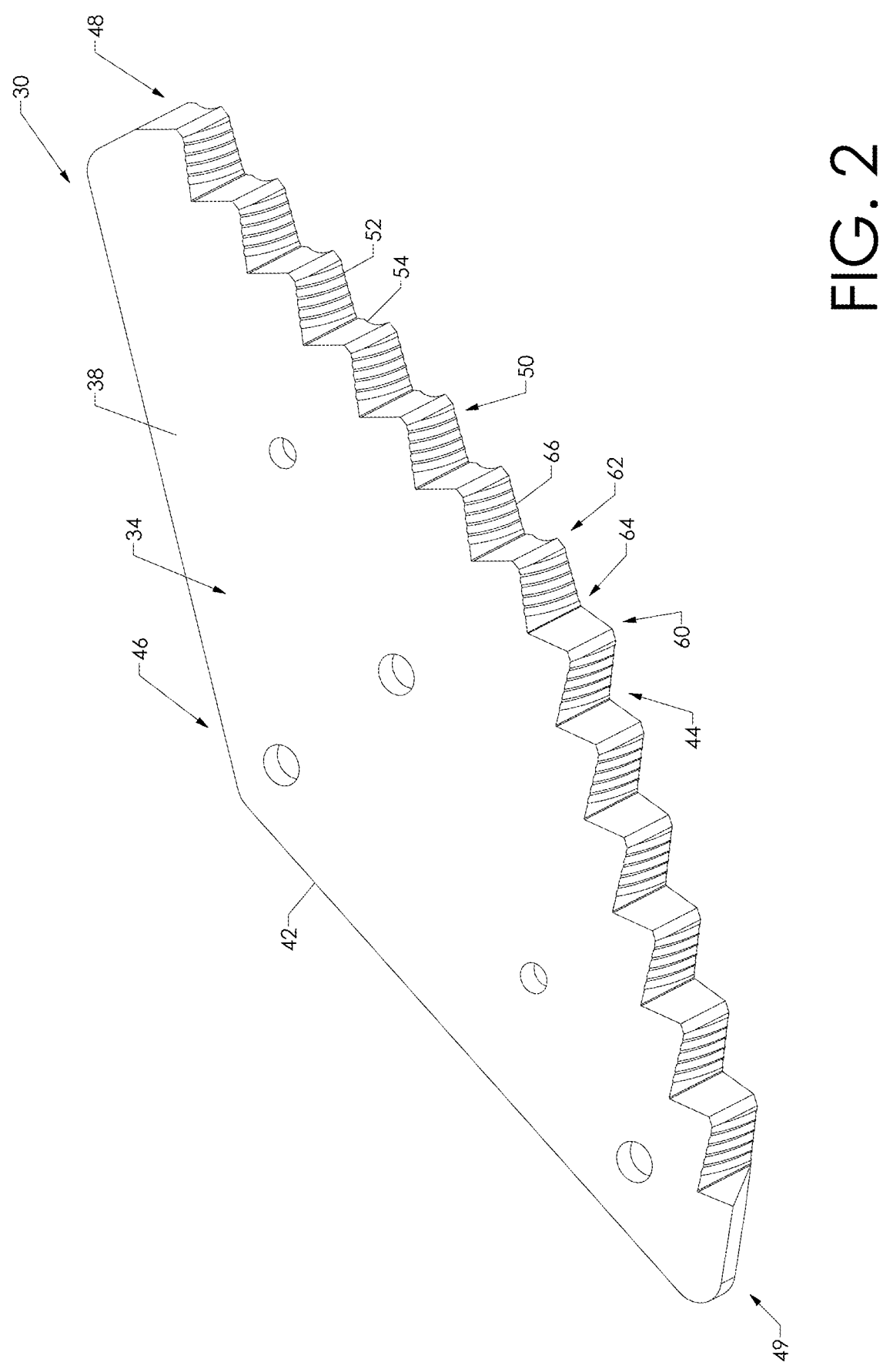
FIG. 2 is a schematic lower perspective view of a second side of the mixer knife, according to an illustrative embodiment.
Figure 3:
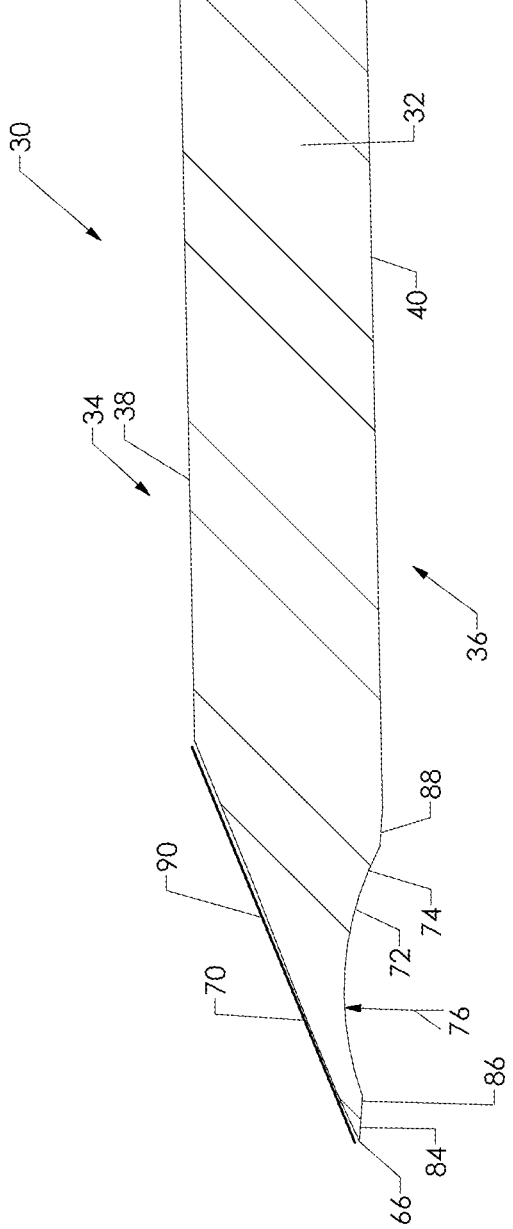
FIG. 3 is a schematic cross-sectional view of a portion of the mixer knife taken along line 3-3 of FIG. 1, according to an illustrative embodiment.
Figure 4:
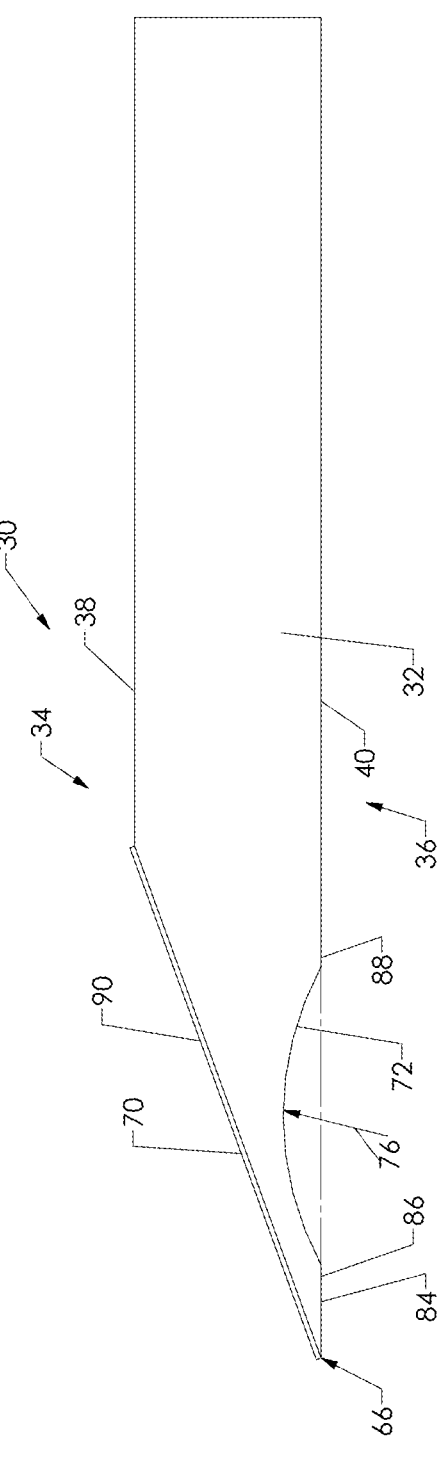
FIG. 4 is a schematic cross-sectional view of a portion of a mixer knife having an optional configuration, according to an illustrative embodiment.

With reference now to the drawings, and in particular to FIGS. 1 through 8 thereof, a new mixer knife and apparatus with mixer knife embodying the principles and concepts of the disclosed subject matter will be described.

The applicants have recognized that agricultural mixer apparatus for cutting and mixing materials or ingredients for producing feed for livestock generally perform well, but that the operation and maintenance of such apparatus would benefit from additional improvements.

More particularly, the applicants have recognized that, in general, mixer knives that are thinner in thickness (e.g., approximately ¼ inch thick) are preferable to relatively thicker knives (e.g., approximately ⅜ inch thick) because a knife with a smaller or thinner cross-section provides a sharper cutting tool that slices through materials more easily. However, the applicants have also recognized that knives with thinner cross-sections are weaker in the body of the knife and as a result require the use of an additional backing plate behind the knife body to enhance the resistance of the knife to cracking or breaking when subjected to forces on the side of the blade, such as when a bale of plant material is dumped into the top of the mixer apparatus.

Conversely, the applicants have also recognized that knives that are thicker are stronger and therefore don't require the use of a backing plate, but also that the thicker cross-section of those knives means that the knives tend to provide less efficient and effective cutting as they become blunted more quickly than knives formed of thinner material as the material of the knife wears back.

To address this problem, the applicants have developed a mixer knife with a scallop or hollow area behind the cutting edge, which may allow the material forming the cutting edge to remain thinner and sharper for a relatively longer period of use as the edge progressively wears back towards the body of the knife. The applicants have recognized that such an approach is advantageous even with respect to more conventional knives which have a carbide coating on one of the surfaces forming the cutting edge, as a longer effective wear life for the cutting edge is produced.

As a result, the knife of the disclosure may utilize a relatively thicker body material to provide the knife with more strength, so the use of a backer plate is not needed to be employed with the knife, while providing more effective cutting than is normally achievable by a mixer knife formed of a thicker body material.

In some embodiments, the disclosure relates broadly to a system for processing materials or ingredients for forming feed for livestock, although the system may be utilized for purposes other than producing feed for livestock. The materials may include, for example, crop materials and nutritional additives to the crop materials. Illustratively, the ingredients may include fibrous plant material bound in a bale.

In some aspects, the system 1 of the disclosure may include an agricultural mixer apparatus 10 which may function to cut or physically breakdown the ingredients and may mix the ingredients together for the feed into a relatively uniform mixture. The mixer apparatus 10 may include a frame 12, and the frame may be configured for moving the apparatus across a ground surface with one or more axles and wheels such that the apparatus may be towed as a trailer, although this is not critical. The apparatus 10 may further include a tub 14 for holding the constituent materials or ingredients of the feed to be mixed. The tub 14 may be mounted on the frame 12 and may define an interior 15 for receiving the ingredients during mixing. Illustratively, the interior 15 may be bounded by a floor 16 at a lower portion of the interior and the tub may have an opening 18 at an upper portion of the interior through which the ingredients are received into the interior. In addition to the floor 16, the tub may have a perimeter wall 20 extending from the floor to the upper opening.

The mixing apparatus may also include an auger 22 which is positioned in the interior 15 of the tub. The auger 22 may extend upwardly from the floor 16 of the tub toward the opening 18 of the tub, and the auger may be rotatable with respect to the frame 12 to rotate with respect to the tub and the contents of the interior. In greater detail, the auger 22 may include a central mast 24 which is rotatably mounted on the frame and extends upwardly from the floor 16. The auger 22 may further include flighting 26 which is mounted on the central mast 24 to rotate with the mast. The flighting 26 may have a helical configuration that extends about the central mast. The flighting 26 may have an upper end and a lower end, with the upper end being located toward the opening 18 of the tub and the lower portion being located toward the floor 16. The flighting 26 has an outer edge 28 which may generally have the shape of a helix.

In some aspects, the system 1 of the disclosure includes a knife 30 alone or in combination with elements of the agricultural mixer apparatus 10. The knife 30 may be removably mounted on the auger 22 of the apparatus such that rotation of the auger in the interior 15 of the tub moves the knife around in the space of the interior to engage contents of the tub for cutting and mixing of the contents, such as the livestock feed ingredients. The knife 30 may be removably mounted on the auger to permit periodic replacement of a worn knife with a new sharper knife. Typically, the knife 30 is mounted on the auger 22 in a manner such that a portion of the knife extends beyond and protrudes from the outer edge 28 of the flighting.

The knife 30 may comprise a plate 32 which has a first side 34 and a second side 36. In the illustrative embodiments, the first side 34 is positioned in an upward direction when the knife is mounted on the auger, and the second side 36 is positioned in a downward direction in the mixer tub when the knife is installed. Optionally, the second side 36 may be oriented upwardly and the first side 34 may be oriented downwardly. A portion of the first side 34 may form a first face 38 of the knife and a portion of the second side 26 may form a second face 40 of the knife. The first face 38 and the second face 40 may be substantially planar in character, and the faces may be oriented substantially parallel to each other, such that a substantial portion of the plate 32 has a uniform thickness.

The plate 32 has a perimeter 42 which generally extends between the first and second sides, and the first and second faces. The perimeter 42 may have a leading extent 44 for being moved by the auger 22 toward the material to be cut or mixed and is oriented in the direction of movement of the knife during operation of the mixer apparatus. The perimeter 42 may also have a trailing extent 46 oriented away from the leading extent and away from the direction of movement of the knife during mixer apparatus operation. The perimeter 42 may also have a pair of end extents 48, 49 which extend between the leading and trailing extents.

The plate 32 has a cutting edge 50 which is located on the leading extent 44 of the perimeter of the plate, and is also positioned between the first 38 and second 40 faces. The cutting edge 50 may be serrated in character, and the cutting edge 50 may include a plurality of edge sections 52, 54 with the edge sections being arranged in a stepped contiguous relationship along the cutting edge.

In greater detail, the plurality of edge sections may include primary edge sections 52 and secondary edge sections 54. Generally, the primary edge sections 52 may be for cutting material, and the secondary edge sections 54 may be for guiding material to be cut toward adjacent primary edge sections, as the secondary edge sections may not be as effective as the primary edge sections in cutting the material in the tub. The primary 52 and secondary 54 edge sections of the cutting edge may be angled with respect to each other to produce serrations 60 in the cutting edge 50. The serrations 60 may have points 62 formed where adjacent primary and secondary edge sections converge. The serrations 60 may also have notches 64 formed where the primary and secondary edge sections converge, such that the points in the notches alternate along the serrated cutting edge.

Each of the primary edge sections 52 may form a sharp tip 66. The sharp tip 66 may be elongated and may be linear in shape. In embodiments, the tip 66 may extend along a line oriented substantially parallel to a plane of the second face, and in some embodiments the sharp tip 66 may lie in the plane of the second face 40 (see, e.g., FIG. 4), while in other embodiments, the tip 66 may be located somewhat out of the plane of the second face (see, e.g., FIG. 3). The primary edge section 52 may be formed by a pair of converging surfaces, which may include a first converging surface 70 and a second converging surface 72. Generally, the first converging surface 70 is on the first side 34 of the plate and is located adjacent to the first face 38 of the plate. The first converging surface 70 may extend between the first face 38 and the tip 66 of the cutting edge. The first converging surface 70 may be planar or substantially planar in shape. The second converging surface 72 is on the second side 36 of the plate and is located adjacent to the second face 40 of the plate. The second converging surface 72 may extend between the second face 40 and the tip 66.

In embodiments, the second converging surface 72 may have a first region 74 which may be characterized by being a depressed region with respect to other regions of the second converging surface, such as a second region 84 of the converging surface 72. The first region 74 may be characterized by being substantially concave in shape, and in the illustrative embodiments the surface of the first region has a curved character in a cross-sectional plane oriented perpendicular to the plane of the first face 38. The surface of the first region 74 may have a radius of curvature dimension 76. Illustratively, the radius of curvature may be from approximately 0.25 inches to approximately 1.5 inches, with a radius of approximately 0.625 inches being suitable for some applications. The first region 74 may be elongated along a first axis 78, and the first axis may extend substantially parallel to the tip 66. The first region 74 may extend from a secondary edge section 54 located adjacent to the primary edge section with which the region 74 is associated, and the first axis 78 of the region 74 may be oriented substantially perpendicular to the secondary edge section from which it extends. The first region 74 may have opposite ends 80, 82, with one of the opposite ends being an open end 80 and another one of the ends being a blind or closed end 82. The open end 80 may be located at the adjacent secondary edge section of the cutting edge. The elongated first region may have a length measured along the first axis 78, and the length may be in a range of approximately 0.25 inches to approximately 2 inches, with approximately 1.25 inches being suitable for some applications.

The second converging surface 72 may also have a second region 84, and the surface of the first region 74 may be depressed into the plate 32 with respect to the second region. The second region 84 may be substantially planar in shape, and may be oriented in a plane or planes that are parallel to, and optionally coplanar with, the plane of the second face 40. The second region 84 may include more than one area, and may have a leading area 86 that is positioned between the first region 74 and the sharp tip 66. The second region 84 may also have a trailing area 88 which may be located between the first region 74 and the second face 40. Illustratively, the trailing area 88 may be coplanar with the second face 40.

Figure 5:
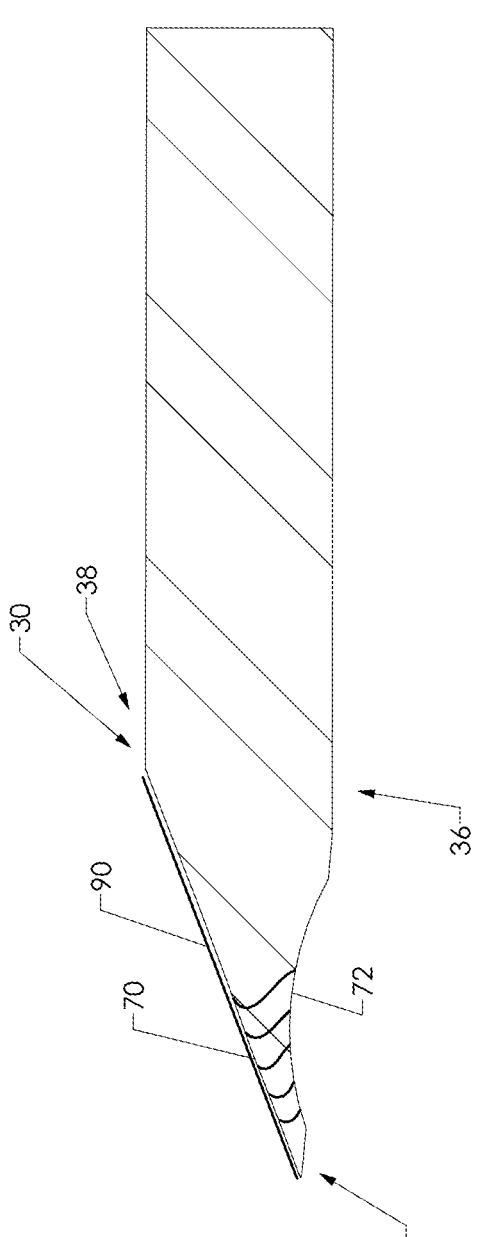
FIG. 5 is a schematic cross-sectional view of the portion of the mixer knife of FIG. 3 showing various stages of wear of the knife cutting edge after progressive use, according to an illustrative embodiment.
Figure 6:
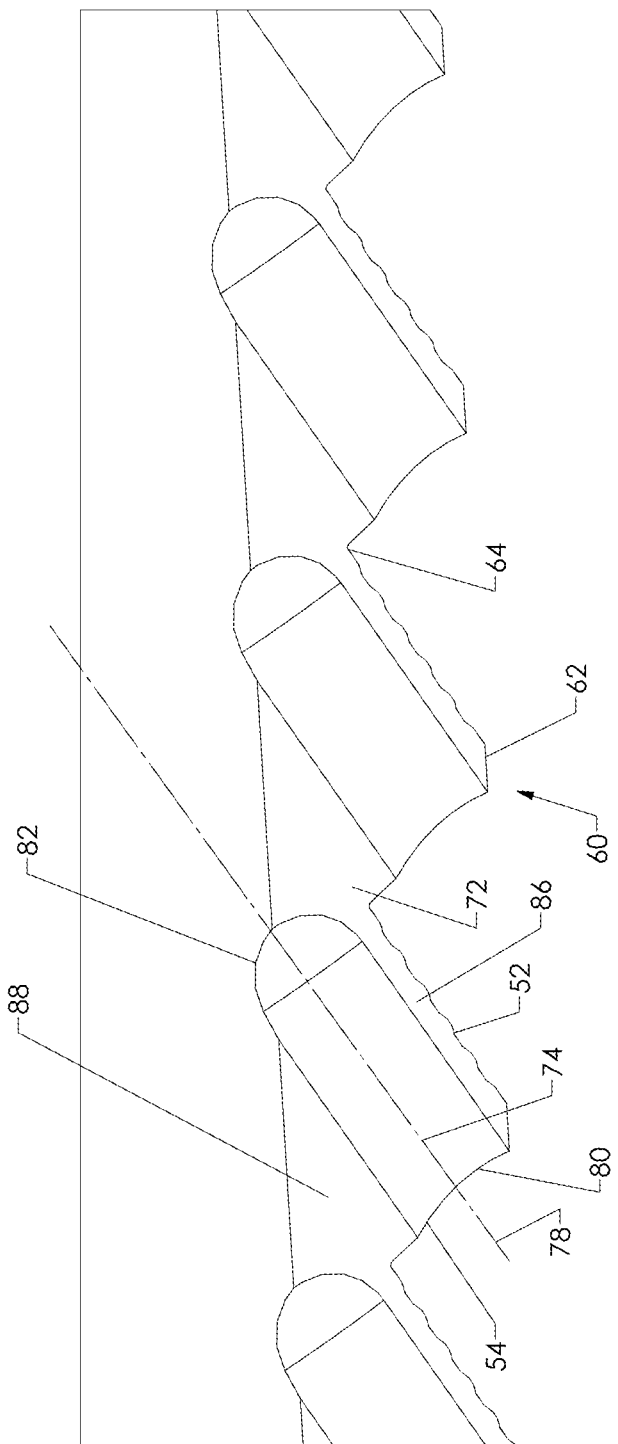
FIG. 6 is a schematic perspective view of a portion of the first side of the mixer knife which is enlarged to show detail, according to an illustrative embodiment.
Figure 7A:
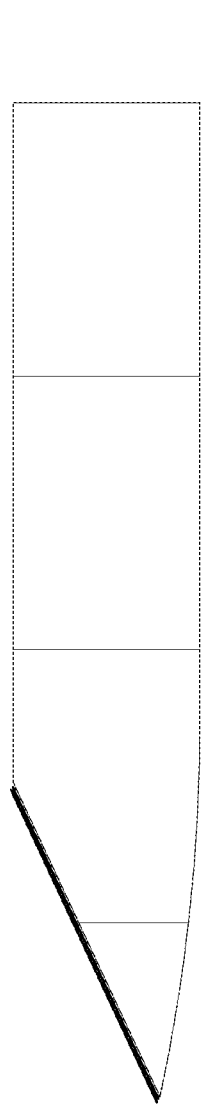
FIG. 7A is a schematic cross-sectional view of a portion of a mixer knife of lacking a number of features of the present disclosure.
Figure 7B:
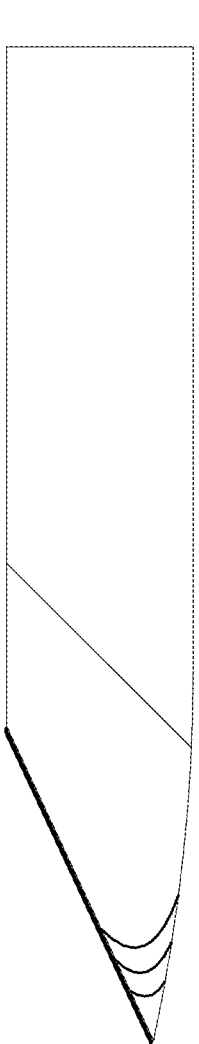
FIG. 7B is a schematic cross-sectional view of a portion of the mixer knife of FIG. 7B showing various stages of wear of the knife cutting edge.
Figure 8:
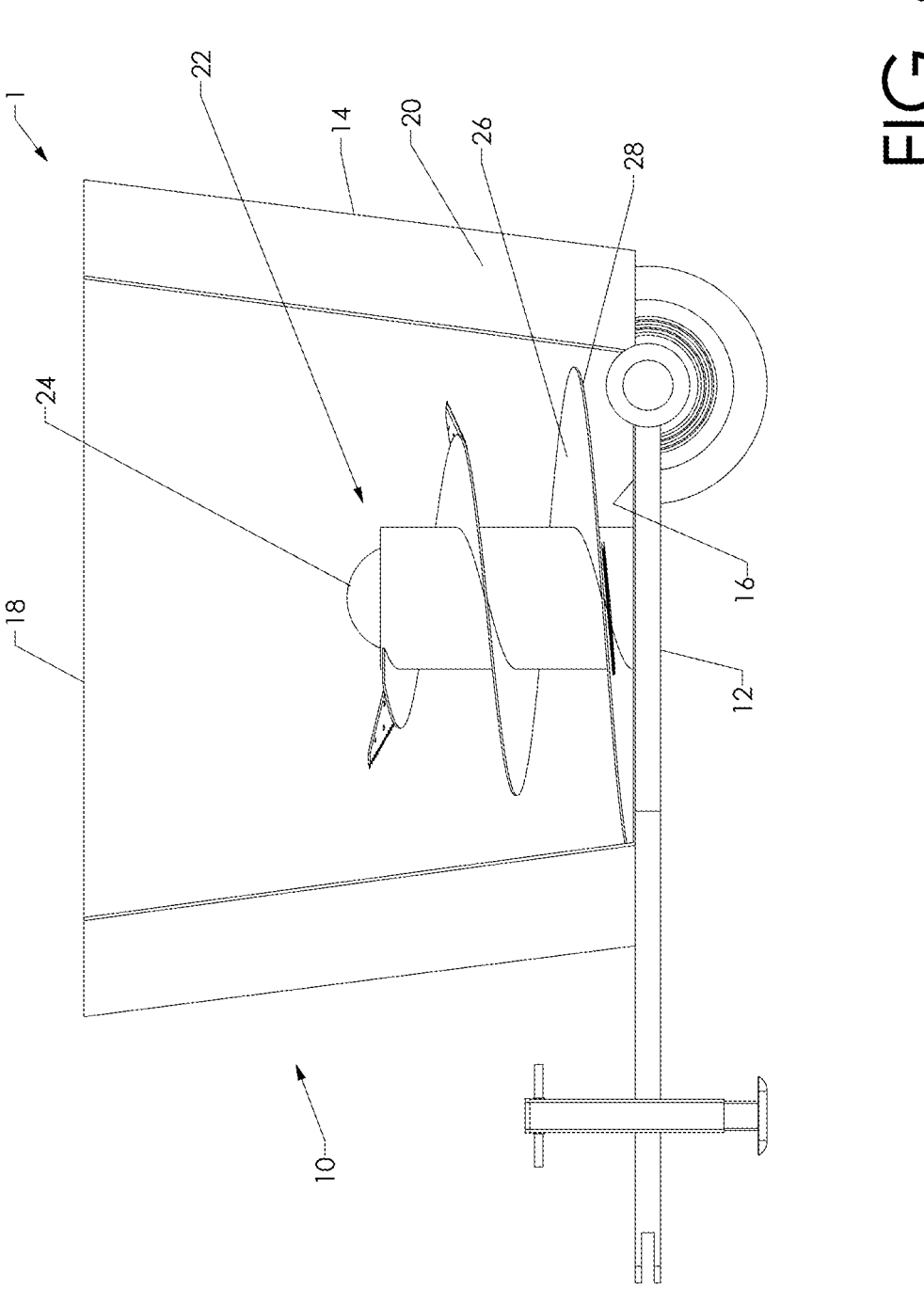
FIG. 8 is a schematic cross-sectional view of a mixer apparatus having a number of the mixer knives of the disclosure mounted thereon.

FIG. 5 provides an illustration of an example of progressive wear of the plate 32 of the knife at the cutting edge 50, showing the maintenance of a relatively thin thickness of the plate at the progressively worn cutting edge as compared to the bulk of the remainder of the plate. The thickness of the cutting edge through this progressive wear can be contrasted with the illustrations in FIG. 7A, which shows an example of an unworn cutting edge of a knife lacking the features of the present disclosure and in FIG. 7B, which shows an example of the progressive wear of a cutting edge of the knife lacking the features of the present disclosure. As can be appreciated from a comparison of the illustrations of FIG. 5 and FIG. 7B, a knife having features of the present disclosure maintains a relatively thinner cutting edge through progressive wear than a knife lacking features of the present disclosure.

Embodiments of the knife 30 may have a cladding material 90 that is applied to at least a portion of the first side 34 of the plate, and may be applied in a layer to the portion of the first side such as at least a portion of the first converging surface 70. Illustratively, the cladding material 90 may be applied in an area of the first converging surface extending from the sharp tip 66 toward the first face 38, and the cladding material may be applied in an area of the first converging surface that extends from the sharp tip 66 to the first face 38. The cladding material 90 may have a hardness characteristic greater than the hardness characteristic of a base material forming the plate 32, and may thus serve to greatly reduce the rate of wear occurring on the relatively less hard plate material located adjacent to the first converging surface 70, and consequently to thereby reduce the wear rate of the relatively thinner material thickness between the first and second converging surfaces. The cladding material 90 may include a carbide material, and may be applied in a suitable manner such as by a laser metal deposition process, while other application techniques and technologies may also produce suitable results. Optionally, other hard-facing materials and technologies may be utilized on the first converging surface opposite of the depressed first region 74 of the second converging surface. As a further option, a cladding material may be omitted from the surfaces of the knife. As yet a further option, the plate 32 may be subjected to heat treatments to increase the wear resistance of the plate and the cutting edge.

Optionally, the positions of the features illustratively described as being located on the upward-facing and downward-facing (when mounted on the mixer apparatus) sides of the knife may be reversed, such that the features illustratively described above as being on the (lower) second converging surface may be located on the (upper) first converging surface of the mounted knife. The orientation employed in a particular equipment application may depend, for example, upon the direction of rotation of the auger utilized by the equipment manufacturer.

It should be appreciated that in the foregoing description and appended claims, that the terms "substantially" and "approximately," when used to modify another term, mean "for the most part" or "being largely but not wholly or completely that which is specified" by the modified term, and may be further quantified as values or qualities which deviate approximately 10 percent or less from the value or quality or relationship stated in the disclosure.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. An agricultural mixer knife for mounting on an auger of an agricultural mixer apparatus, the knife comprising:

a plate having a first side and a second side, a portion of the first side forming a first face and a portion of the second side forming a second face, the plate having a perimeter positioned between the first and second sides, the perimeter having a leading extent for being moved by the auger toward the material to be cut and a trailing extent opposite of the leading extent; and wherein the plate has a cutting edge located on the leading extent of the perimeter, the cutting edge being serrated with a plurality of edge sections arranged in a stepped contiguous relationship along the cutting edge, the plurality of edge sections including primary edge sections and secondary edge sections;

the primary edge section having a sharp tip formed by a pair of converging surfaces, the pair of converging surfaces comprising a first converging surface and a second converging surface, the first converging surface being adjacent to the first face of the plate and the second converging surface being adjacent to the second face; and wherein the second converging surface has a first region and a second region, the first region being concave and depressed into the plate with respect to the second region, the first region being elongated along a first axis extending substantially parallel to the primary edge section of the cutting edge.

2. The knife of claim 1 wherein the first axis of the first region is oriented substantially perpendicular to one of the secondary edge sections of the cutting edge.

3. The knife of claim 1 wherein the primary edge section of the cutting edge is substantially linear and extends along a line oriented substantially parallel to a plane of the second face.

4. The knife of claim 1 wherein the first converging surface of the cutting edge is substantially planar.

5. The knife of claim 1 wherein the second region of the second converging surface is substantially planar.

6. The knife of claim 5 wherein the second region of the second converging surface has a leading area located between the first region and the sharp tip and a trailing area located between the first region and the second face.

7. The knife of claim 6 wherein the trailing area is coplanar with the second face of the plate.

8. The knife of claim 1 wherein a cladding material is applied to at least a portion of the first side of the plate extending from the sharp tip, the cladding material having a hardness characteristic greater than a hardness characteristic of the base material of the plate.

9. The knife of claim 8 wherein the cladding material includes a carbide material.

10. The knife of claim 1 wherein the second face of the plate defines a plane, and the sharp tip lies in the plane of the second face.

11. A system comprising:

an agricultural mixer apparatus comprising:

a frame;

a tub mounted on the frame and defining an interior for receiving ingredients of animal feed;

an auger positioned in the interior of the tub and being rotatable with respect to the frame, the auger including a central mast rotatably mounted on the frame and flighting mounted on the central mast to rotate with the mast, the flighting having an outer edge; and a mixer knife mounted on the auger and positioned to extend from the auger to engage ingredients of animal feed in the interior of the tub, the knife comprising:

a plate having a first side and a second side, a portion of the first side forming a first face and a portion of the second side forming a second face, the plate having a perimeter positioned between the first and second sides, the perimeter having a leading extent for being moved by the auger toward the material to be cut and a trailing extent opposite of the leading extent;

wherein the plate has a cutting edge located on the leading extent of the perimeter, the cutting edge being serrated with a plurality of edge sections arranged in a stepped contiguous relationship along the cutting edge, the plurality of edge sections including primary edge sections and secondary edge sections;

the primary edge section having a sharp tip formed by a pair of converging surfaces, the pair of converging surfaces comprising a first converging surface and a second converging surface, the first converging surface being adjacent to the first face of the plate and the second converging surface being adjacent to the second face;

wherein the second converging surface has a first region and a second region, the first region being concave and depressed into the plate with respect to the second region; and wherein the first region is elongated along a first axis extending substantially parallel to the primary edge section of the cutting edge.

12. The system of claim 11 wherein the first axis of the first region is oriented substantially perpendicular to one of the secondary edge sections of the cutting edge of the knife.

13. The system of claim 11 wherein the first converging surface of the cutting edge of the knife is substantially planar.

14. The system of claim 11 wherein the second region of the second converging surface of the cutting edge of the knife is substantially planar.

15. The system of claim 14 wherein the second region of the second converging surface of the cutting edge of the knife has a leading area located between the first region and the sharp tip and a trailing area located between the first region and the second face.

16. The system of claim 15 wherein the trailing area is coplanar with the second face of the plate of the knife.

17. The system of claim 11 wherein the knife includes a cladding material applied to at least a portion of the first side of the plate extending from the sharp tip, the cladding material having a hardness characteristic greater than a hardness characteristic of the base material of the plate.

18. The system of claim 17 wherein the cladding material includes a carbide material.

19. The system of claim 11 wherein the first side of the plate of the knife is positioned in an upward direction in the tub and the second side of the plate is positioned in a downward direction in the tub.

20. An agricultural mixer knife for mounting on an auger of an agricultural mixer apparatus, the knife comprising:

a plate having a first side and a second side, a portion of the first side forming a first face and a portion of the second side forming a second face, the plate having a perimeter positioned between the first and second sides, the perimeter having a leading extent for being moved by the auger toward the material to be cut and a trailing extent opposite of the leading extent; and wherein the plate has a cutting edge located on the leading extent of the perimeter, the cutting edge being serrated with a plurality of edge sections arranged in a stepped contiguous relationship along the cutting edge, the plurality of edge sections including primary edge sections and secondary edge sections;

the primary edge section having a sharp tip formed by a pair of converging surfaces, the pair of converging surfaces comprising a first converging surface and a second converging surface, the first converging surface being adjacent to the first face of the plate and the second converging surface being adjacent to the second face;

wherein the second converging surface has a first region and a second region, the first region being concave and depressed into the plate with respect to the second region, the first region being elongated along a first axis extending substantially parallel to the primary edge section; and wherein the first regions of the second converging surfaces of the primary edge sections are arranged with respect to the cutting edge of the plate so that the first axes of the first regions are oriented substantially parallel to each other in spaced relationships to each other.

* * * * *